United States Patent
Ebihara

(10) Patent No.: US 6,800,982 B2
(45) Date of Patent: Oct. 5, 2004

(54) ELECTRIC MOTOR HAVING BRUSH HOLDER WITH AXIAL MOVEMENT LIMITING ARMATURE CONTACT MEMBER PROTECTOR

(75) Inventor: Yoshio Ebihara, Kariya (JP)

(73) Assignee: Denso Corporation (JP)

( * ) Notice: Subject to any disclaimer, the term of this patent is extended or adjusted under 35 U.S.C. 154(b) by 70 days.

(21) Appl. No.: 10/140,206

(22) Filed: May 8, 2002

(65) Prior Publication Data

US 2002/0180301 A1 Dec. 5, 2002

(30) Foreign Application Priority Data

May 29, 2001 (JP) .................................. 2001-161093

(51) Int. Cl.[7] .................... H01R 39/38; H01R 39/06; H01R 39/40; H01R 39/18; H02K 13/00
(52) U.S. Cl. .................. 310/239; 310/71; 310/233; 310/237
(58) Field of Search ................ 310/219, 233, 310/237–239, 40 R

(56) References Cited

U.S. PATENT DOCUMENTS

| | | | | |
|---|---|---|---|---|
| 3,573,522 A | * | 4/1971 | Pentland | 310/239 |
| 4,371,803 A | * | 2/1983 | Schindel et al. | 310/242 |
| 4,593,220 A | * | 6/1986 | Cousins et al. | 310/239 |
| 4,593,221 A | * | 6/1986 | Harris et al. | 310/242 |
| 4,613,781 A | * | 9/1986 | Sanders | 310/239 |
| 4,673,836 A | * | 6/1987 | Akiyama et al. | 310/239 |
| 4,800,312 A | * | 1/1989 | Wacek et al. | 310/239 |
| 4,851,730 A | * | 7/1989 | Fushiya et al. | 310/249 |
| 5,013,221 A | | 5/1991 | Tuckey | 417/365 |
| 5,019,741 A | * | 5/1991 | Fukui et al. | 310/239 |
| 5,157,299 A | * | 10/1992 | Gerlach | 310/237 |
| 5,175,463 A | * | 12/1992 | Farago et al. | 310/237 |
| 5,184,041 A | * | 2/1993 | Baer et al. | 310/239 |
| 5,221,130 A | * | 6/1993 | Satoh et al. | 310/239 |
| 5,245,240 A | * | 9/1993 | Takasaki | 310/237 |
| 5,255,426 A | * | 10/1993 | Farago et al. | 29/597 |
| 5,386,167 A | * | 1/1995 | Strobi | 310/237 |
| 5,400,496 A | * | 3/1995 | Kemmner et al. | 29/597 |
| 5,442,849 A | * | 8/1995 | Strobl | 29/597 |
| 5,530,311 A | * | 6/1996 | Ziegler | 310/237 |
| 5,552,652 A | * | 9/1996 | Shimoyama et al. | 310/237 |
| 5,637,944 A | * | 6/1997 | Shimoyama | 310/237 |
| 5,644,182 A | * | 7/1997 | Rawls | 310/249 |
| 5,677,588 A | * | 10/1997 | Strobl | 310/237 |
| 5,714,826 A | * | 2/1998 | Furukawa et al. | 310/251 |
| 5,780,952 A | * | 7/1998 | Lau | 310/239 |
| 5,793,140 A | * | 8/1998 | Tuckey | 310/237 |
| 5,808,393 A | * | 9/1998 | Penfold et al. | 310/242 |
| 5,821,662 A | * | 10/1998 | Kajino et al. | 310/239 |
| 5,895,995 A | * | 4/1999 | Soh | 310/239 |
| 5,905,323 A | * | 5/1999 | Clemente | 310/239 |

(List continued on next page.)

FOREIGN PATENT DOCUMENTS

JP 2000-23425 1/2000

Primary Examiner—Joseph Waks
Assistant Examiner—Pedro J Cuevas
(74) Attorney, Agent, or Firm—Nixon & Vanderhye PC

(57) ABSTRACT

An electric motor provides a carbon contact member of a commutator from colliding with a brush holder. A projection is formed in the brush holder so that it projects toward an end face of a resin mold of an armature. An end face of this projection, which is opposed to the end face of the resin mold of the armature, is positioned in the axial direction so as to form a clearance between the contact members and the brush holder when the armature is moved toward the brush holder by an external force and the end face comes in contact with the end face. As a result, if shock is applied to the fuel pump and the armature moves toward the brush holder, the contact members of the commutator are prevented from colliding with the brush holder. It thereby becomes possible to prevent the carbon contact members from being damaged.

19 Claims, 3 Drawing Sheets

U.S. PATENT DOCUMENTS

| | | | | |
|---|---|---|---|---|
| 5,925,962 A | * | 7/1999 | Kobman et al. | 310/237 |
| 5,962,946 A | * | 10/1999 | Kobman et al. | 310/233 |
| 5,977,682 A | * | 11/1999 | Clemente | 310/239 |
| 6,066,907 A | * | 5/2000 | Matsushima et al. | 310/239 |
| 6,163,096 A | * | 12/2000 | Michenfelder et al. | 310/239 |
| 6,326,716 B1 | * | 12/2001 | Niimi et al. | 310/239 |
| 6,369,484 B1 | * | 4/2002 | Kageyama et al. | 310/233 |
| 6,445,104 B1 | * | 9/2002 | Sato | 310/239 |
| 6,452,297 B2 | * | 9/2002 | Yamamoto et al. | 310/89 |
| 6,518,686 B2 | * | 2/2003 | Bailey et al. | 310/239 |
| 6,563,245 B1 | * | 5/2003 | Suzuki et al. | 310/91 |
| 6,617,745 B1 | * | 9/2003 | Reinartz et al. | 310/247 |
| 6,664,698 B1 | * | 12/2003 | Tasch et al. | 310/239 |
| 6,677,963 B1 | * | 1/2004 | Mani et al. | 345/764 |
| 6,750,585 B2 | * | 6/2004 | You | 310/239 |

* cited by examiner

ELECTRIC MOTOR HAVING BRUSH HOLDER WITH AXIAL MOVEMENT LIMITING ARMATURE CONTACT MEMBER PROTECTOR

CROSS REFERENCE TO RELATED APPLICATION

This application is based on, and claims the benefit of priority of, prior Japanese Patent Application 2001-161093 filed on May 29, 2001, the contents of which are incorporated herein by reference.

BACKGROUND OF THE INVENTION

1. Field of the Invention

This invention relates to an electric motor which is particularly useful, for instance, as a fuel pump driving motor installed in a fuel tank of a motor vehicle.

2. Description of Related Art

Generally, a fuel pump is installed in the fuel tank of a motor vehicle and is driven with an electric motor to transport fuel. For example, there is a fuel-pump disclosed in U.S. Pat. No. 5,013,221 which comprises a pump chamber and an electric motor that controls the operation of the pump chamber. The motor rotates with electricity supplied to a planar commutator installed perpendicular to the rotation axis via brushes that are resiliently pressed on the commutator by a resilient member. Since a fuel pump is immersed in a fuel (for example, hydrocarbons) during operation, the pump must be corrosion-resistant to the fuel. For this purpose, the motors disclosed in U.S. Pat. No. 5,157,299 and Japanese Patent Laid-Open Publication No. Hei. 9-182381 employ a sintered carbon material for the contact members that is slidably in contact with the brushes of the commutator in order to provide corrosion resistance and to improve the durability of the commutator and brushes.

In such prior art electric motors, a brush holder that holds the brushes slidably on the contact face is opposed to the commutator in the axial direction. Thus, if the armature is pushed (due to shock) toward the brush holder, the carbon contact members of the commutator collide with the brush holder which may damage the carbon contact members.

SUMMARY OF THE INVENTION

It is, therefore, an object of the present invention to provide an electric motor having a structure for preventing a carbon contact member of a commutator from colliding with a brush holder and from being damaged even when an armature has moved in the axial direction toward the brush holder.

To attain this goal, the invention adopts the following techniques. The first aspect of the present invention provides an electric motor in which a limiter structure is formed to limit the movement of the armature toward the brush holder in the axial direction. The limiter structure is formed in at least either the brush holder or the armature to provide clearance between the contact member and the brush holder when the armature has been brought in contact with the limiter structure. Then, since there is no concern that the contact member of the commutator may collide with the brush holder even when the armature is jarred by shock toward the brush holder, it becomes possible to prevent the carbon contact member of the commutator from being damaged.

The electric motor may have a projection serving as a limiter structure that is formed on the brush holder and that is opposed to the armature. Then, since this limiter structure prevents the contact member of the commutator from colliding with the brush holder even when the armature is forced toward the brush holder, it becomes possible to protect the carbon contact member of the commutator from damage. In this case, the limiter structure can be easily obtained by forming a projection on the brush holder in a position opposed to an outer periphery of a resin mold of the armature or to a supporting member of the commutator. The electric motor may have a limiter structure that is a projection of either a whole or partial outer periphery of the resin mold of the armature. In this manner, the limiter structure can be easily formed.

Another aspect of the present invention provides an electric motor in which a limiter structure limiting the movement of an armature toward a brush holder in the axial direction is formed in at least either of the brush holder or the armature to meet a condition such that L1<L2. L1 is a distance between the limiter structure and an opposing contact face, and L2 is a distance between the contact member of the commutator and an opposing face of the brush holder. Then, since there is no concern that the contact member of the commutator may collide with the brush holder even when the armature is jarred by shock toward the brush holder, it becomes possible to prevent the carbon contact member of the commutator from being damaged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

These and other objectives and advantages of the present invention will become apparent from the following description with reference to the accompanying drawings, wherein.

DETAILED DESCRIPTION OF THE PREFERRED EMBODIMENTS

Now the electric motor of the present invention will be described below with reference to the accompanying drawings, based on an example of adopting this motor in a motor-driven fuel pump. The following description is merely exemplary in nature and is in no way intended to limit the invention, its application, or uses.

First Embodiment

Figure 1:
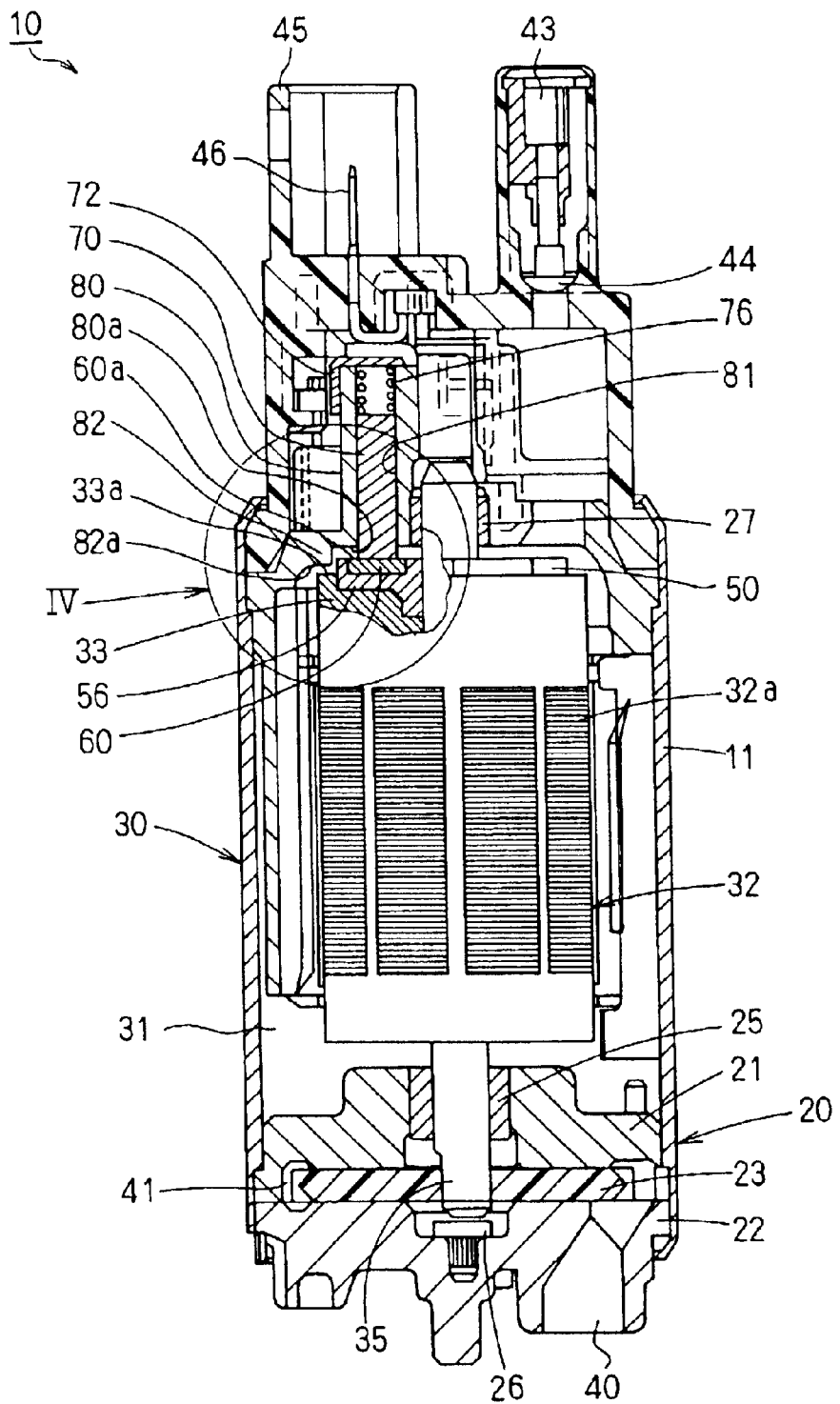
FIG. 1 is a cross-sectional view of a fuel pump according to a first embodiment of the invention.

FIG. 1 shows a fuel pump 10 according to a first embodiment of the invention. The fuel pump 10 is installed typically in the fuel tank of a motor vehicle to serve as the fuel transport system for an electronic or other fuel injection system. The pump draws in fuel from a fuel tank (not shown)

and then sends the fuel to the engine (not shown). The fuel pump 10 comprises a pump unit 20 and a motor unit 30 which is an electric motor that drives the pump unit 20. The motor unit 30 is a DC brush motor in which a ring-type permanent magnet (not shown) is mounted on the inside of a cylindrical housing 11, and an armature 32 is coaxially installed inward of the permanent magnet.

The pump unit 20 includes a casing 21, a casing cover 22 and an impeller 23. The casing 21 and the casing cover 22 form one casing unit, and this casing unit incorporates the impeller 23 as a rotor that rotates. The casing 21 and the casing cover 22 are formed by, for instance, aluminum die-casting, but are not limited to such a material. The casing 21 is inserted in one end of the housing 11 and fixed therein, and a bearing 25 is fitted in its center. The casing cover 22 is put on the casing 21 and then fixed by swaging onto one end of the housing 11. A thrust bearing 26 is pushed (pressed) and fixed in the center of the casing cover 22. One end of a rotary shaft 35 of the armature 32 is rotatably supported by the bearing 25 in the rotary shaft's radial direction, and the thrust bearing 26 supports or opposes an axial force applied toward the thrust bearing 26. The other end of the rotary shaft 35 is rotatably supported by a bearing 27 that is pushed in and fitted to a brush holder 80.

A fuel intake 40 is formed in the casing cover 22 while the impeller 23 has propeller segments in its periphery that rotate so that the fuel in a fuel tank (not shown) may be drawn into a pump passage 41 via the fuel intake 40. The pump passage 41 is formed in a C-shape along the outer periphery of the impeller 23 between the casing 21 and the casing cover 22. The fuel taken in the pump passage 41 is compressed by the rotation of the impeller 23 and then pushed into a fuel chamber 31 of the motor unit 30.

The armature 32 is rotatably incorporated in the motor unit 30, and a coil (not shown) is wound around a core 32a. A disk-shaped commutator 50 is installed over the armature 32, as shown in FIG. 1. A power supply (not shown) provides electric power for the coil via a terminal 46 embedded in a connector 45, brushes 70 and the commutator 50. When the armature 32 rotates due to the supplied electric power, the impeller 23 also rotates together with the rotary shaft 35 of the armature 32. With the impeller 23 rotating, fuel is drawn in from the fuel intake 40 to the pump passage 41 and then this fuel is transported under pressure from the pump passage 41 to the fuel chamber 31. The fuel receives momentum energy from the propeller segments of the impeller 23. The fuel sent to the fuel chamber 31 runs outside the armature 32 and goes out of the fuel pump 10 from a fuel outlet 43. The fuel outlet 43 has a check valve 44 which prevents a reverse flow of the fuel that is discharged from the fuel outlet 43.

Figure 2:
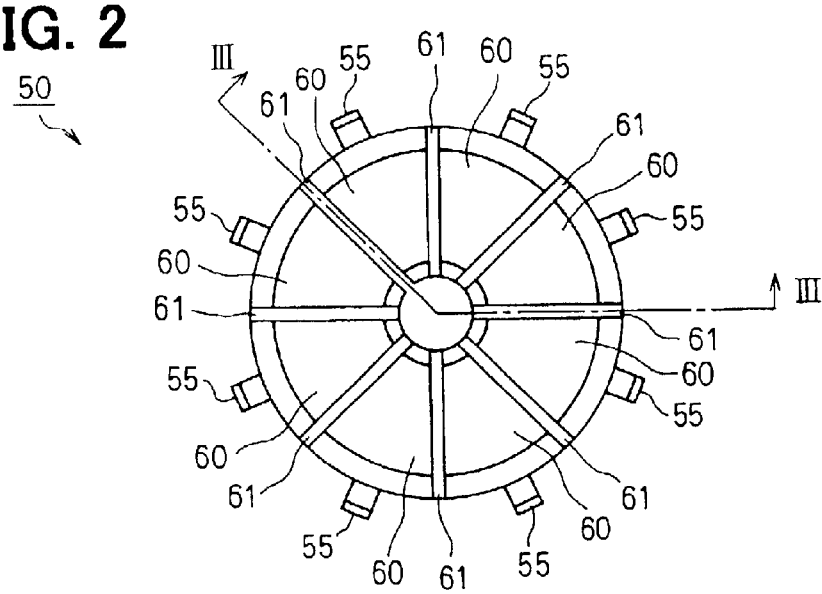
FIG. 2 is a plan view of a commutator according to the first embodiment of the invention.
Figure 3:
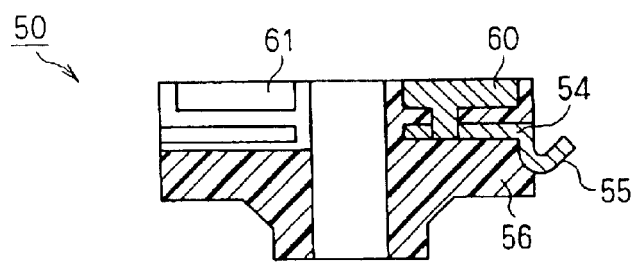
FIG. 3 is a cross-sectional view taken along line III—III in FIG. 2.

Now the structure of the motor unit 30 is described below in detail. As shown in FIGS. 2 and 3, the commutator 50 has eight contact members 60 formed at even angular intervals and a supporting member 56 that supports the contact members 60. The contact members 60 are made of carbon and are slidably in contact with the brushes 70. The terminal unit 54 is made of highly conductive metals such as copper and fastened to the contact member 60 to provide electrical continuity thereto. The terminal unit 54 has a hook 55 that projects from the commutator 50, and the coil (not shown) of the armature 32 is electrically coupled with this hook 55 by fusing. The supporting member 56 is made of an insulating thermoset resin, for instance, phenol resin, and holds the contact members 60 and the terminal unit 54. Since a groove 61 extends to the supporting member 56 from the contact member 60 via the terminal unit 54, the contact members 60 are electrically isolated from one another. The commutator 50 is pushed in and fitted to the rotary shaft 35 and fastened thereto so that it maintains a predetermined distance from the core 32a of the armature 32 on the opposite side of the pump unit 20. The terminal unit 54 is not shown in FIG. 1.

The armature 32 is assembled by placing the rotary shaft 35 in the core 32a of a multi-layered magnetic material such as electromagnetic steel sheets. The commutator 50 is fastened on the opposite side of the pump unit 20 of the core 32a. The core 32a has eight projection poles (not shown) that are evenly spaced at angular intervals, and a coil is wound in each groove (slot) in between the adjacent poles (not shown). Both ends of each coil are electrically coupled with the hook 55 of the commutator 50 by fusing. After the coupling between the hook 55 and each coil is complete, the core 32a and the commutator 50 are molded in resin 33 to maintain the electrical isolation of this junction and the coil as well to prevent corrosion caused by contact with fuel. The face of the commutator 50 opposed to the brush holder 80 is not molded because it is slidably in contact with the brushes 70.

The brushes 70 are made of carbon and are movable in the axial direction within a guide 81 of the brush holder 80. A pigtail (not shown), which is a conductive material, is connected to the brush 70 for electric continuity to the terminal 46. The pigtail is formed with a number of twisted, thin, flexible copper wires that do not block the movement of the brush 70 in the guide 81. The pigtail provides electric continuity to the terminal 46 via a brush retainer plate 72. At the same time, the brushes 70 are resiliently pressed toward the commutator 50 by a spring 76 which is a resilient member.

The brush holder 80 is made of a dielectric material, for instance, thermoset resin and has a pair of guides 81 that incorporate the brushes 70 so that they are axially movable. The bearing 27 is fitted in the brush holder 80 to radially support the rotary shaft 35 of the armature 32. In other words, both ends of the armature 32 are rotatably supported in the radial direction by bearing 27 and bearing 25 that is fitted in the casing 21 of the pump unit 20. The brush holder 80 has a projection 82 as the limiter structure that limits the movement of the armature 32 in the axial direction toward the brush holder 80. The projection 82, opposed to an end face 33a of the resin 33 of the armature 32, has an arch-shape end face 82a that shares a common axis with the end face 33a. The axial position of this end face 82a is determined so as to form a clearance C between the contact members 60 and the opposed brush holder 80 when the armature 32 is moved by an external force toward the brush holder 80 in the axial direction and then the end face 33a comes in contact with the end face 82a.

Figure 4:
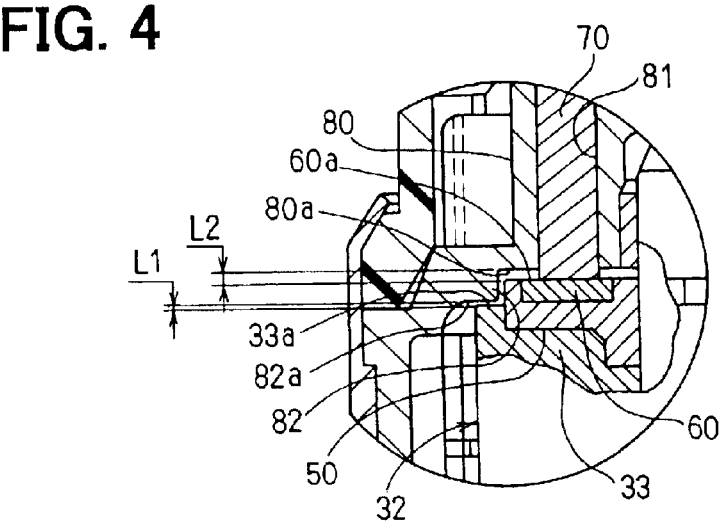
FIG. 4 is an enlarged view of region IV in FIG. 1.

Explaining the setting of this clearance C in a different way, as shown in FIG. 4, the shape of the projection 82 is determined to meet the relation, L1<L2, where L1 is the distance between the end face 82a of the projection 82 and the opposing end face 33a of the resin 33 of the armature 32 and L2 is the distance between the contact face 60a of the contact member 60 and the opposing face 80a of the brush holder 80. Therefore, the relationship C=L2−L1 is established. Ultimately, FIG. 4 is an enlarged view of region IV in FIG. 1, demonstrating the situation in which an end face 33a of a resin 33 of an armature 32 is in contact with an end face 82a of a projection 82.

As described in the first embodiment of the present invention, the projection 82 is formed that projects toward the end face 33a of the resin 33 of the armature 32 in the brush holder 80 of the motor unit 30 of the fuel pump 10. The end face 82*a* of projection 82, which is opposed to the end face 33*a* of the resin 33 of the armature 32, is positioned in the axial direction so as to form the clearance C between the contact members 60 and the brush holder 80 when the armature 32 is moved toward the brush holder 80 by an external force and the end face 33*a* comes in contact with the end face 82*a*. In other words, its axial position is determined so that the contact members 60 do not collide with the opposing brush holder 80. As a result, if shock is applied to the fuel pump 10 and the armature 32 moves toward the brush holder 80, the contact members 60 of the commutator 50 are prevented from colliding with the brush holder 80, and it thereby becomes possible to protect the carbon contact members 60 from damage.

This is an economical method for preventing damage of the carbon contact members 60 of the commutator 50 because it can be realized by a minimum modification to the motor, that is, by forming projection 82 in the brush holder 80.

Second Embodiment

Figure 5:
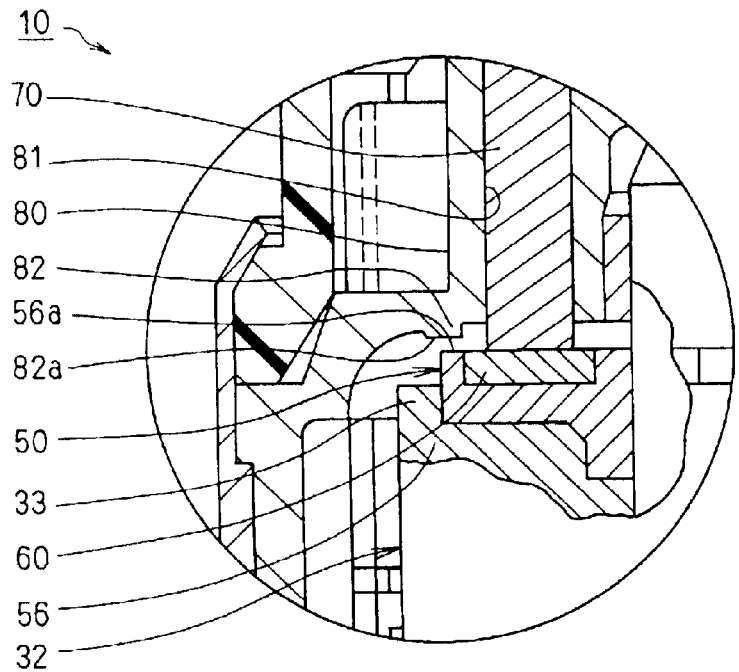
FIG. 5 is a fragmentary cross-sectional view of a fuel pump according to a second embodiment of the invention.

Now the fuel pump 10 in accordance with a second embodiment of the invention will be described. FIG. 5 is a fragmentary cross-sectional view of a fuel pump 10 according to the second embodiment of the invention. In the second embodiment, the position of the projection 82 formed in the brush holder 80 is changed in the motor unit 30 of the fuel pump 10, compared with the first embodiment. Namely, in the second embodiment, the projection 82 has an arch-shape end face 82*a* sharing a common axis with an end face 56*a*, and is opposed to the end face 56*a* of the supporting member 56 of the commutator 50.

In this structure, when the armature 32 has moved toward the brush holder 80 in the axial direction, pushed by shock applied to the fuel pump 10, the end face 56*a* comes in contact with the end face 82*a* to restrict the movement of the armature 32. As is the case with the first embodiment, since a clearance C is formed between the contact members 60 and the brush holder 80, a collision between the contact members 60 and the brush holder 80 is prevented and it thereby becomes possible to protect the carbon contact members 60 of the commutator 50 from damage.

Third Embodiment

Figure 6:
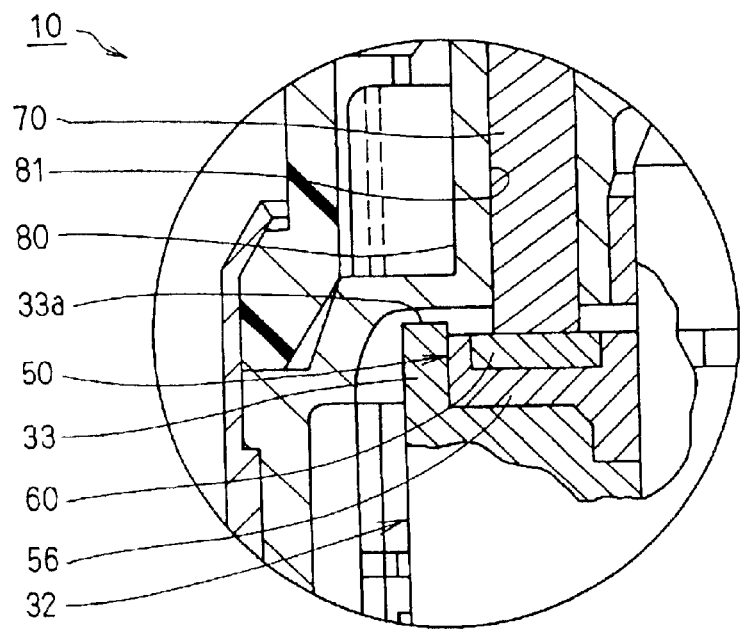
FIG. 6 is a fragmentary cross-sectional view of a fuel pump according to a third embodiment of the invention.

Next, a fuel pump 10 in accordance with a third embodiment of the invention is described below. FIG. 6 is a fragmentary cross-sectional view of a fuel pump 10 according to the third embodiment of the invention. In the third embodiment, the position of the limiter structure that limits the movement of the armature 32 in the axial direction toward the brush holder 80 is changed from the brush holder 80 to the armature 32 in the motor unit 30 of the fuel pump 10, compared with the first embodiment. Namely, in the third embodiment, the resin 33 that molds the armature 32 has a ring-shape projection toward the brush holder 80.

In this case, when the armature 32 has moved toward the brush holder 80 in the axial direction, moved by shock applied to the fuel pump 10, the end face 33*a* of the resin 33 comes in contact with the brush holder 80 and the movement of the armature 32 is thereby limited. At this movement, as is the case with the first embodiment, since a clearance C is formed between the contact members 60 and the brush holder 80, the collision of the contact members 60 with the brush holder 80 is prevented and it thereby becomes possible to protect the carbon contact members of the commutator 50 from damage.

In the first and second embodiments, the end face 82*a* of the projection 82 is formed into an arch-shape. However, it may be a ring shape. Also in the third embodiment, the resin 33 that molds the armature 32 has a ring-shape projection toward the brush holder 80. However, it may not be a complete ring but a few segments of a ring. In this case, they should be formed at even angular intervals in order to reduce the weight imbalance around the rotary shaft 35 of the armature 32.

Alternatively, the end face 33*a* of the resin 33 may not be employed as the limiter structure. That is, the supporting member 56 made of resin of the commutator 50 may be used as the limiter structure so as to contact the brush holder 80.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric motor comprising:

a commutator having a plurality of contact members made of carbon and electrically isolated from each other and a supporting member for supporting said plurality of contact members;

an armature having a rotary shaft, wherein said commutator is coaxially fixed at one end thereof, said armature being molded in a resin;

a pair of brushes biased along said rotary shaft by a resilient member on said plurality of contact members of said commutator; and a brush holder axially opposed to said commutator of said armature, for rotatably holding said rotary shaft and holding said brushes movably along the axial direction, wherein a limiter structure limiting movement of said armature toward said brush holder in the axial direction is formed in at least either of said brush holder or said armature to provide a clearance between said contact members and said brush holder when the movement of said armature is stopped by said limiter structure, an axial direction of said brushes and an axial direction of said rotary shaft being substantially parallel, and the limiter structure projecting in a direction parallel to the axial direction of the rotary shaft.

2. The electric motor according to claim 1, wherein said limiter structure is a projection formed on said brush holder so as to project toward said armature.

3. The electric motor according to claim 2, wherein said projection is opposed to an outer periphery of a resin mold of said armature.

4. The electric motor according to claim 2, wherein said projection is opposed to said supporting member of said commutator.

5. The electric motor according to claim 2, wherein said limiter structure is formed by projecting either whole or part of an outer periphery of a resin mold of said armature toward said brush holder.

6. An electric motor comprising:

a planar commutator having a plurality of contact members that are made of carbon and electrically isolated from each other;

a supporting member for supporting said plurality of contact members;

an armature having a rotary shaft and said commutator coaxially fixed at one end thereof, said armature being molded in a resin;

a pair of brushes biased along said rotary shaft by a resilient member on said plurality of contact members of said commutator; and a brush holder axially opposed to said commutator of said armature, for rotatably holding said rotary shaft and holding said brushes movably along the axial direction, wherein a limiter structure limiting movement of said armatur toward said brush holder in the axial direction is formed in at least either of said brush holder or said armature to meet a condition, L1<L2, where L1 is a distance between said limiter structure and the opposing contact face and L2 is a distance between the contact member of said commutator and the opposing face of said brush holder, an axial direction of said brushes and an axial direction of said rotary shaft being substantially parallel, and the limiter structure projecting in a direction parallel to the axial direction of the rotary shaft.

7. An electric motor comprising:

a commutator having a plurality of contact members;

a supporting member for supporting said plurality of contact members;

an armature having a rotary shaft, wherein said commutator is coaxially fixed at a first end of the rotary shaft;

a pair of brushes adjacent to said first end of said rotary shaft and biased by a resilient member at one end of said plurality of contact members of said commutator; and a brush holder axially opposed to said commutator of said armature, for rotatably supporting said rotary shaft and movably supporting said brushes parallel to the rotary shaft; and a limiter structure which limits movement of said armature in the armature's axial direction so that said contact members do not make contact with said brush holder when said armature moves toward said brush holder, an axial direction of said brushes and an axial direction of said rotary shaft being substantially parallel, and the limiter structure projecting in a direction parallel to the axial direction of the rotary shaft.

8. The electric motor according to claim 7, wherein said contact members are made of carbon and are electrically isolated from each other.

9. The electric motor according to claim 8, wherein said armature is molded in a resin.

10. The electric motor according to claim 9, wherein said limiter structure is formed on said brush holder.

11. The electric motor according to claim 9, wherein said limiter structure is formed on said armature.

12. The electric motor according to claim 7, wherein said limiter structure is formed by a protruding portion on an end face of said brush holder and protrudes toward said commutator of said armature.

13. The electric motor according to claim 7, wherein said limiter is a continuous protruding portion of said armature.

14. The electric motor according to claim 7, wherein said projection is opposed to an outer periphery of a resin mold of said armature.

15. The electric motor according to claim 7, wherein said projection is opposed to said supporting member of said commutator.

16. The electric motor according to claim 7, wherein said limiter structure is formed by projecting either whole or part of an outer periphery of a resin mold of said armature toward said brush holder.

17. The electric motor according to 1, wherein the limiter structure limits movement of the commutator in a direction parallel to the axial direction of the shaft.

18. The electric motor according to 6, wherein the limiter structure limits movement of the commutator in a direction parallel to the axial direction of the shaft.

19. The electric motor according to 7, wherein the limiter structure limits movement of the commutator in a direction parallel to the axial direction of the shaft.

* * * * *